United States Patent Office.

LEOPOLD SPIEGEL, OF BERLIN, GERMANY, ASSIGNOR TO THE CHEMISCHE FABRIK GUESTROW, OF GUESTROW, GERMANY.

YOHIMBINE AND PROCESS OF MAKING SAME.

SPECIFICATION forming part of Letters Patent No. 684,650, dated October 15, 1901.

Application filed July 9, 1900. Serial No. 23,021. (Specimens.)

*To all whom it may concern:*

Be it known that I, LEOPOLD SPIEGEL, a subject of the Emperor of Germany, residing at Berlin, Germany, have invented a certain new and useful Process of Manufacturing Yohimbine, of which the following is a specification.

Yohimbine is one of the alkaloids found in yohimbehé-bark, which forms an article of export of Kamerun, Southwest Africa. The bark is that of a tree belonging to the family *Apocynaceæ*, species *Tabernæmontana*. A more exact identification of the plant from which the bark is obtained is impossible at the present time, as only the bark has been examined. This has long been used by the natives of Southwest Africa for its medical properties. The plant itself has never been brought to the coast, and the natives claim to obtain the bark from other tribes in the interior in the way of trade and profess ignorance as to its origin. To produce this alkaloid in its pure state, the pulverized bark is extracted with dilute acetic acid. From this acetic-acid solution the alkaloid is precipitated by the addition of carbonate of soda and after drying is purified by repeated recrystallizations from alcohol.

Yohimbine corresponds to the formula $C_{22}H_{30}N_2O_4$ or $C_{23}H_{32}N_2O_4$. It crystallizes in the form of white needles, melting at 234° centigrade. Its corresponding salts are formed by treating the alkaloid with dilute acids or aqueous solutions of the same and evaporating the solvent until crystallization begins. The hydrochloric salt has the formula $C_{22}H_{28}N_2.O_3.HCl$ or $C_{23}H_{30}N_2O_3.HCl$. It consists of minute white needles, melting at 300° centigrade. The nitrate forms colorless ribbed prisms, which are decomposed at 292° centigrade without melting. The sulfate is obtained by adding concentrated sulfuric acid to the alcoholic solution of the alkaloid and precipitating the salt by the addition of ethyl ether. These acid salts are easily soluble in water.

Yohimbine is easily soluble in methyl, ethyl, and amyl alcohol, ether, acetone, and chloroform, less soluble in benzene, and nearly insoluble in water. Its characteristic reactions are the following: It dissolves colorless in concentrated sulfuric acid. A minute crystal of potassium bichromate added to it produces a zone with a rich blue-violet margin, which slowly turns to a dull green. With concentrated nitric acid it forms a colorless solution, which quickly turns a deep yellow, turning a beautiful orange-red on adding an excess of caustic-soda solution. Erdmann's reagent causes a dark blue-black color, which quickly turns greenish and finally yellowish brown.

The salts of yohimbine are used in medicine as stimulants, acting on the nerve-centers and the heart. The normal dose of the chlorhydrate is 0.005 grams or ten drops of a one-per-cent. solution, which may be given thrice daily. The maximal dose should not exceed 0.0225 grams per diem, as larger doses act poisonous. The salts of yohimbine may be taken in aqueous solution or in carefully-dosed tablets, or the solution may be injected subcutaneously.

Having thus fully described my invention, what I claim as new, and desire to secure by Letters Patent, is—

1. The process of extracting yohimbine from yohimbehé-bark which consists in extracting the pulverized bark with dilute acetic acid, precipitating the alkaloid with carbonate of soda and purifying the same by recrystallization from alcohol as described.

2. The alkaloid yohimbine, crystallizing in white needles from alcohol, nearly insoluble in water, having a melting-point of 234° centigrade and corresponding nearly to the formula $C_{22}H_{30}N_2O_4$, substantially as set forth.

In testimony whereof I affix my signature in presence of two witnesses.

LEOPOLD SPIEGEL.

Witnesses:
  WOLDEMAR HAUPT,
  HENRY HASPER.